No. 846,835. PATENTED MAR. 12, 1907.
H. W. EISENBISE.
FIRE APPARATUS.
APPLICATION FILED JUNE 6, 1904.
2 SHEETS—SHEET 2.
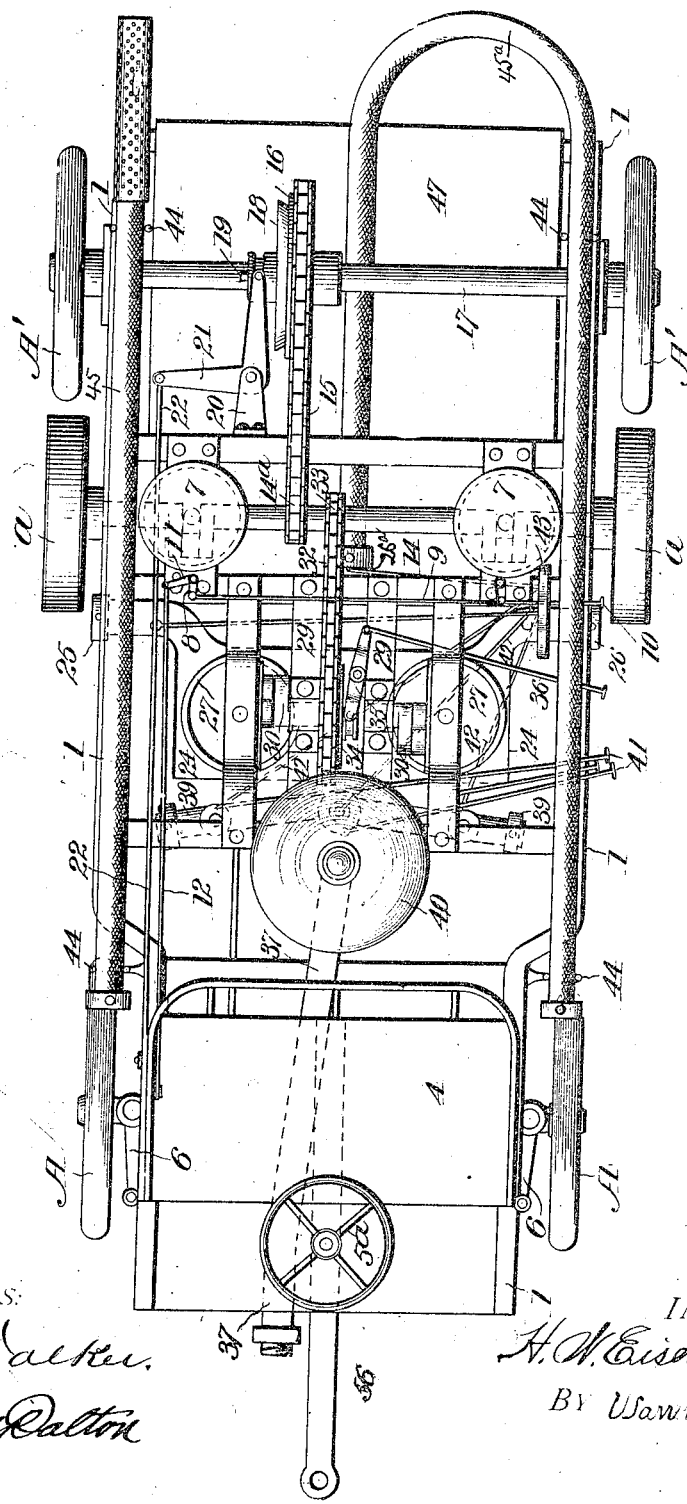
WITNESSES:
C. H. Walker.
Theodore Dalton.
INVENTOR
H. W. Eisenbise
BY Wawn E. Willis.
Attorney

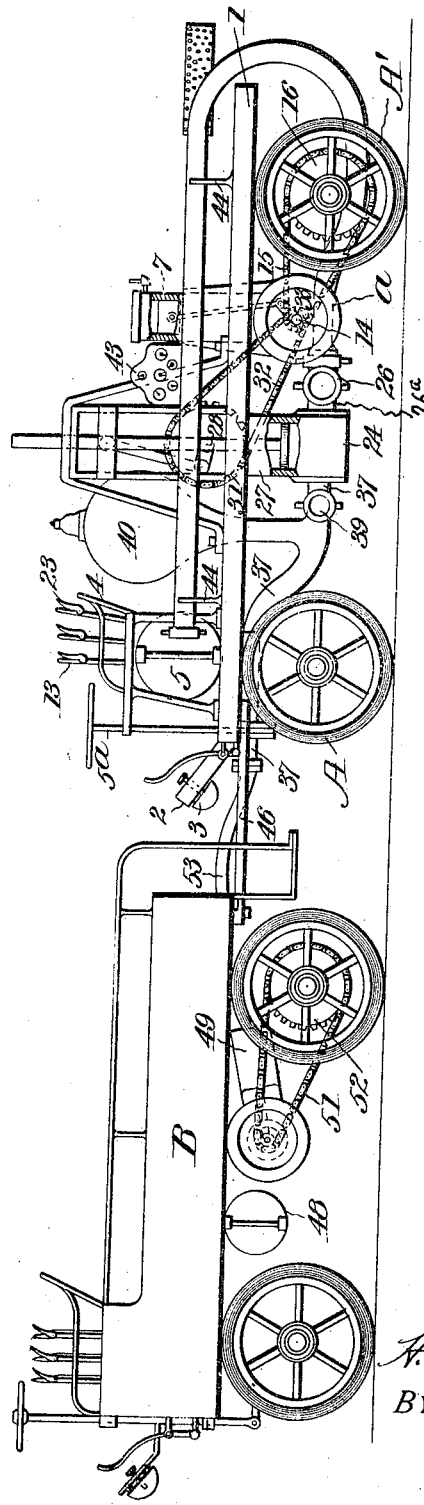

UNITED STATES PATENT OFFICE.

HARRY W. EISENBISE, OF READING, PENNSYLVANIA.

FIRE APPARATUS.

No. 846,825.

Specification of Letters Patent.

Patented March 12, 1907.

Application filed June 6, 1904. Serial No. 211,267.

*To all whom it may concern:*

Be it known that I, HARRY W. EISENBISE, a citizen of the United States, residing at Reading, in the county of Berks and State of Pennsylvania, have invented certain new and useful Improvements in Improved Fire Apparatus, of which the following is a specification.

My invention relates to improvements in automobile fire apparatus; and the objects are, first, to provide an automobile fire-engine which carries the pumps, the hose, and other mechanism and appliances comprising a fully-equipped fire-engine; second, to reduce to a minimum the expense, labor, and time associated with the care and operation of a fire-engine; third, to provide an engine of the kind named and for the purpose intended which has the dual capacity of propelling the vehicle and of operating the pumps independently of propulsion when the engine is brought into service to deliver a stream of water; fourth, to associate and combine with the engine an automobile hose-wagon detachably coupled to the engine-vehicle and carrying a line of hose permanently connected to the effluent nozzle of the engine-hose, the purpose being to deliver both vehicles at their destination at the same time, and then by uncoupling the hose-wagon from the engine-vehicle the wagon can proceed to position independently of the engine and play out the hose as it progresses, while in the meantime the suction-nozzle may be connected to the fire-plug; and still another purpose is to obviate the necessity of maintaining a preliminary water-heater in the engine-house to keep the water in the boiler of a steam fire-engine ready for action.

With these stated objects and purposes in view the invention embodies a suitable gas or gasolene engine adapted to propel the vehicle and to operate the pumps independently of each other.

The invention also embodies a pump, a gasolene-engine to operate the pump, an influent pipe to the pump, an effluent pipe leading from the pump and provided with one or more branches, and means to control the passage and pressure of water through one or all of the pipes.

The invention also embodies a pump, an engine to operate the pump, an influent pipe feeding the pump, effluent pipes leading from the pump, valves in the effluent-pipes, and means to control the valves independently of each other to regulate the flow and pressure of the water therethrough.

The invention generally consists in the novel construction of parts and their assemblage or aggroupment in operative combination, all as will be hereinafter particularly pointed out and distinctly claimed.

It may be premised that while the improvements are illustrated in the preferred form, comprising a fire-engine and a hose-wagon coupled in front of it, sufficient space may be provided on the floor of the engine to carry a complement of hose.

I have fully and clearly illustrated the improvements in the annexed drawings, to be taken as a part of this specification, and wherein—

Figure 1 is a side elevation of the engine and the auxiliary and subsidiary elements associated therewith, also a side elevation of the hose-wagon coupled to the engine-vehicle in advance thereto. Fig. 2 is a plan view of the complete engine, indicating the arrangement of the parts or elements in relative assemblage.

In the drawings the same parts appearing in both illustrations are indicated by similar reference notations.

The motor or engine and the pump may be of any of the improved and approved types, and therefore these have been illustrated in conventional delineation; but the connections, controlling-levers, the clutch mechanisms, and rods are particularly shown because they enter into the asserted novelty.

Referring now to the drawings, A A' designate the front and rear wheels of the running-gear of the engine, the axles of which carry a frame 1, the side bars of which are connected by cross-bars, as shown. At the front of the frame is the foot-rest 2, carrying a bell 3. On the front part of the frame is positioned and secured the motorman's seat 4, made high enough to receive the gasolene tank or reservoir 5 under it, substantially as shown. A steering-wheel and staff 5ª are provided, the staff having connection to the usual operating-bars connected to the levers 6, which control the direction of the front wheels. On a suitable frame extending across and secured to the frame 1 are mounted the engine-cylinders 7, the gasolene-induction valves therein being controlled by levers 8, mounted on the valve-stems and united by a rod 9, so that the valves are operated in unison. The rod 9 is extended beyond its connection to the lever 8, as at 10, so that the engineer may manipulate the valves while the engine is being used to operate the pumps. To the other lever 8 is fixed one end of an arm 11, the free end of which is connected to a pull-rod 12 and the other end connected to the throttle-lever 13 at the motorman's seat, wherefore both valves and both engines may be operated from the seat when the vehicle is being propelled as well as from the side of the vehicle when the engines are operating the pumps.

14 designates the engine-shaft, provided with cranks, as indicated in the drawings, which have operative connection to the pistons of the cylinders. On the engine-shaft 14 is fixed a sprocket-wheel 14ª, on which is arranged a sprocket-chain 15, which is arranged on a larger sprocket-wheel 16, loosely mounted on the rear axle 17. The rim of the sprocket-wheel is reamed out and has fitted therein a friction-clutch 18, slidably mounted on the axle 17 and held against rotation on the shaft by a key or spline 19. Secured to the frame which supports the engine is a bracket 20, to the free end of which is pivotally supported an elbow-lever 21, which constitutes the clutch-lever having the usual connection with the clutch, and to the other arm of the lever is connected a pull-rod 22, operatively connected to the lever 23 at the motorman's seat. On each end of the engine-shaft is mounted a fly-wheel a, serving well-known purposes. It will now be seen that when the clutch 18 is engaged and the engine active the vehicle will be propelled and that when the clutch is disengaged the engine will have no effect on the axle and the sprocket-wheel is free to revolve.

On a properly-constructed frame carried by the main frame 1 is mounted and secured the pump, in this instance comprising a pump-chamber 24 of such capacity and dimensions as may suit it for the work to be done. At the rear side of the pump-chamber are laterally-extending influent pipes 25 26, provided at their ends with the usual coupling pieces or rings, substantially as shown. On the pump-chamber are vertically-positioned oppositely-disposed pumping-cylinders 27, provided with pumping-pistons actuated by a crank-shaft 28, journaled in cross-pieces 29 and having oppositely-arranged cranks 30 to operate the pistons alternately. On the crank-shaft 28 is loosely mounted a sprocket-wheel 31, whereon is arranged a sprocket-chain 32, which extends about a sprocket-pinion 33, fixed on the engine-shaft 14. The sprocket-wheel 31 is reamed out and has fitted thereto a friction-clutch 34, having its hub slidably disposed on the shaft and held against revolution on the shaft by any of the usual means. The friction-clutch is moved into and out of engagement by a lever 35, the free end thereof being connected to a rod 36, running to the side of the engine and terminating at a point convenient for manipulation. It will now be seen that when the engine reaches its destination the clutch 18 is thrown out of engagement by the lever 21 and propulsion immediately stops; but the engine remains in operation. The clutch 34 is then thrown into engagement, and the engine then exerts its power to operate the pumps.

From the main effluent pipe 37, leading from the pump-chamber and adjacent thereto, lead two oppositely-directed discharge-pipes 38 39, to which lines of hose may be coupled in the usual manner. In the main discharge-pipe is set the air-chamber 40 to make the discharge continuous and even. In each discharge pipe or nozzle connected permanently to the pump-chamber or forming a part thereof is placed a valve for stopping and regulating the flow of water therethrough. These valves are operated by means of pull-rods 41, leading to each valve, and from each valve opens a small pipe 42, leading to gage-indicators 43 to indicate the amount of pressure existing in any one or all of the active discharges. A stop-clock may be inserted in the gage-case to indicate the time when the alarm is struck.

It may be stated that the influent and effluent extensions on the pump-chamber are permanently connected therewith or may be made an integral part thereof. It may also be stated that both clutches may be disengaged, and thus the engine will be free to run loose and without imparting motion to either of the pumps or to the engine.

On the side rails of the main frame 1 are secured supports 44, wherein are carried sections of suction-hose 45 and 45ª, substantially as seen in the drawing. One end of the section-hose 45ª is permanently coupled to the main influent pipe 26ª at the center of the pump-chamber and is therefore always ready for service when the other end has been coupled to the plug.

46 designates a coupling-bar whereby the engine-vehicle may be coupled to the rear end of the hose-wagon. The main frame 1 is provided with a platform 47, on which the firemen can stand while being carried to the fire.

As heretofore stated, one of the objects of the present invention is to combine with the pumping mechanism an automobile hose-wagon detachably hitched or coupled to the front of the engine-vehicle and carrying a complement of hose permanently connected to the hose system carried by the engine-vehicle, so that when the two vehicles reach a destination the hose-wagon may be uncoupled and proceed, playing out the hose as it proceeds, and the engine-vehicle remains stationary and ready to be coupled to the fire-plug. Now referring to the drawing, Fig. 1, B designates the hose-wagon equipped with all the necessary appliances, such as a bell, a foot-lever, steering mechanism and controlling-levers, and a standing step at the rear. Under the wagon-body is arranged the gasolene-motor, comprising a gasolene-feed tank 48, which supplies fuel to the gasolene-engine 49, having a sprocket on its shaft whereon is a driving-chain 51, carried about a sprocket-wheel 52, secured on the rear axle of the wagon, substantially as seen in the drawings, Fig. 1. The wagon is supplied with the required quantity of hose, laid to unfold when the wagon moves forward after being uncoupled from the engine-vehicle, the end of the hose being permanently coupled to the end of the main discharge-pipe 37 of the pumps, substantially as seen at 53 in Fig. 1 of the drawings.

The objects and functions of the respective elements have been clearly stated in the statements of their description; but the utilization of the machines in practice may be rehearsed as follows: When the vehicles are to be started for a fire, the engines are supplied with the proper charges of fuel and become immediately ready for use. The clutch on the rear axle of the engine is then engaged and the other pump-clutch disengaged. Power is then let on and the two vehicles proceed to their destination. When that has been reached, they are stopped, the rear clutch of the engine is disengaged and the pump-clutch engaged, the coupling 46 is uncoupled, and the hose-wagon started up and proceeds in playing out the hose. In the meantime the proper connections are made to the fire-plug, and when the hose has been laid as desired the engine is started and the pump forces the water to the point required.

It will be readily perceived that expedition, always an element of good service, is promoted by the combination of the hose-wagon and engine in the manner described; also, that the expenses attending such service are greatly reduced, and in many apparent respects the improvements tend to promote the service, lessen labor, reduce time, and curtail expenses.

Having thus described my invention, what I claim, and desire to secure by Letters Patent, is—

In combination, a fire-engine provided with suitable pumping mechanism, a hose-wagon detachably coupled to the front end of the fire-engine and having a length of hose connected to the discharge of the pumping mechanism, self-propelling means for the hose-wagon, distinct self-propelling means for the fire-engine, and clutch mechanism between the last-named means and the pumping mechanism.

In testimony whereof I have affixed my signature in presence of two witnesses.

HARRY W. EISENBISE.

Witnesses:
 LEMUEL S. RUTH,
 DANIEL WUNDER.